April 24, 1945. J. MARGIS, JR 2,374,551
BRAKE FOR FISHING REELS
Filed June 16, 1944
Fig. 1.
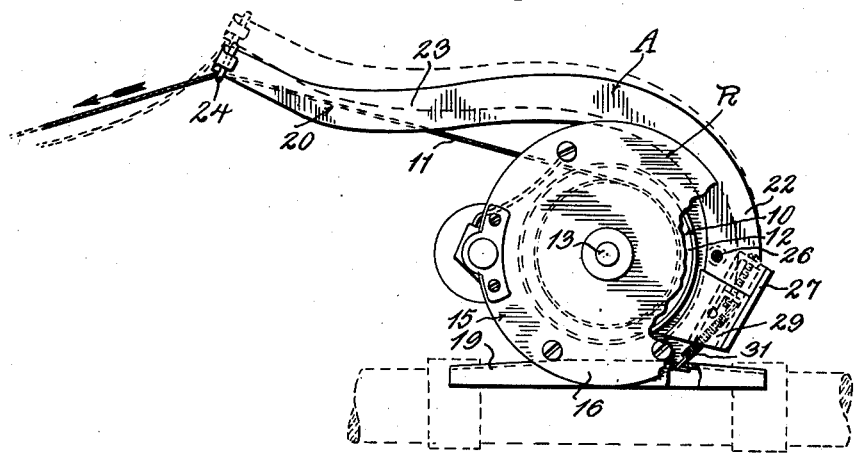
Fig. 2.
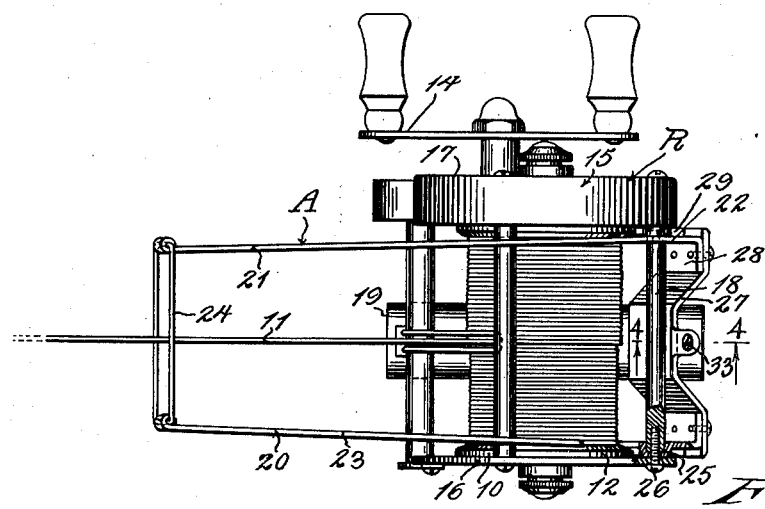
Fig. 3.
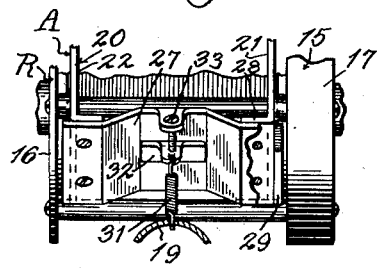
Fig. 4.
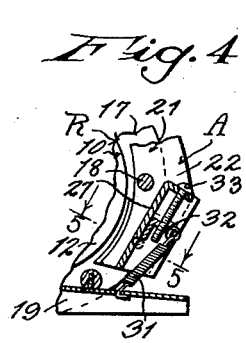
Fig. 5.
INVENTOR
JOHN MARGIS JR.
BY
ATTORNEYS Patented Apr. 24, 1945

2,374,551

UNITED STATES PATENT OFFICE 2,374,551

BRAKE FOR FISHING REELS

John Margis, Jr., Franksville, Wis.

Application June 16, 1944, Serial No. 540,682

1 Claim. (Cl. 242—84.5)

This invention appertains to anti-backlash attachments for fishing reels and is an improvement on my Patent No. 2,262,462 issued to me November 11, 1941.

One of the primary objects of my present invention is to provide an anti-backlash attachment for reels in which the brake shoes thereof are so arranged as to engage the end disc of the spool, when slack occurs in the line, whereby said disc will function as brake drums and thereby eliminate the necessity of providing an extraneous brake drum on the spool shaft.

Another salient object of my invention is to provide novel means for forming and mounting the swinging brake levers on the reel frame, whereby said levers will be out of the way of all operating parts of the reel and whereby the same can be effectively supporting for swinging movement by one of the cross frame rods of the reel.

A further important object of my invention is to provide brake levers of a novel form, whereby the brake shoes thereof will effectively engage the spool, when slack occurs in the line and whereby the shoes will be positively moved away from the spool as soon as the line is under tension.

With these and other objects in view the invention consists in the novel construction, arrangement and formation of parts, as will be hereinafter more specifically described, claimed, and illustrated in the accompanying drawing in which drawing:

Figure 1 is a side elevational view of a reel showing my novel attachment incorporated therewith, parts of the view being shown broken away and in section to illustrate structural detail.

Figure 2 is a top plan view of my reel with parts thereof broken away and in section.

Figure 3 is a fragmentary rear elevational view of the reel with parts thereof broken away and in section.

Figure 4 is a detail sectional view taken on the line 4—4 of Figure 2 looking in the direction of the arrows and illustrating the novel spring connection between the brake levers and the frame of the reel, and Figure 5 is an enlarged fragmentary detail sectional view taken on the line 5—5 of Figure 4 looking in the direction of the arrows illustrating the mounting of one of the brake shoes.

Referring to the drawing in detail, wherein similar reference characters designate corresponding parts throughout the several views the letter A generally indicates my improved anti-backlash attachment for a fishing reel R.

The fishing reel R can be considered as of the type now generally found in the open market, and the same will not be described in detail, but it is to be noted that the same includes a rotatable spool 10 on which is wound the fishing line 11. The spool 10 includes end discs 12, which can be of the usual dished shape. The spool is mounted upon the spool shaft 13 and is operated by means of a handle or crank 14. Rotatably supporting the spool and its shaft is the reel frame 15 and the frame includes the usual end plates 16 and 17 connected together by the frame rods 18. The frame is securely fastened to the bracket 19 which is curved to fit the reel seat on a fishing rod.

My improved anti-backlash attachment A includes a pair of spaced companion brake levers 20 and 21. These levers are of like form and are joined together for synchronous movement and each includes the arcuate rear end portion 22 and a forwardly extending arm 23. The arcuate portions 22 of the levers extend over the reel in back thereof between the side plates 16 and 17 and extend down toward the bracket 19. The arms 23 extend over the reel and project forwardly a considerable distance beyond the reel so that the same will not interfere with any working parts of the reel, such as the level wind mechanism. The forward terminals of the arms 23 are connected together by a line guide 24. This line guide 24 extends transversely of the reel and is in the nature of an elongated eye. As illustrated, the line guide 24 is formed from wire and the ends of the levers can be bent over the ends of the guide to hold the same in position.

The arcuate portions 22 of the brake levers, intermediate their ends, are provided with struck out bearing flanges 25 and these bearing flanges receive the ends of an adjacent cross rod 18. After the levers are associated with this cross rod the same can be placed back in the reel by the side plates 16 and 17 and again held in place by the usual screws 26. This forms an admirable support for the levers and no extra parts are needed to rockably mount the levers in place.

The extreme lower ends of the arcuate portions 22 are connected together by a transversely extending cross strap 27 and this cross strap is fastened to inturned feet 28 formed on the ends of the levers. The cross strap extends slightly beyond the levers and friction brake shoes 29 are securely fastened to the levers in abutting relation with the extended ends of the strap. Screws 30 can be employed for holding the brake shoes in place so that the shoes can be readily renewed when wear takes place.

By referring to Figures 1 and 3 it can be seen that the strap 27 is disposed directly above the rear end of the bracket 19 and a contractile coil spring 31 is employed for connecting the strap with the bracket. Consequently the spring normally functions to pull down on the brake levers and to urge the brake shoes inwardly toward the spool. The brake shoes are arranged in close proximity to the inner faces of the end frame plates 16 and 17 of the reel and consequently when the brake shoes are urged inwardly the same will frictionally engage the end discs 12 of the spool and these end discs will cooperate with the shoes and function as brake drums. One end of the spring 31 is securely fastened to the bracket 19 and the other end of the spring is fastened to a slide bracket 32 carried by the cross plate 27. An adjusting screw 33 is adjustably carried by the strap and is threaded into the guide bracket. Obviously by turning the screw the slide bracket can be slid back and forth on the strap to adjust the tension of the spring.

In the operation of my device, the reel is used in the ordinary manner, but the line is threaded through the eye 24. Consequently in casting or when a tension is exerted on the line, the line will engage the guide and pull down on said guide. This will rock the brake levers on the cross rod 18 against the tension of the spring 31 and consequently the brake shoes will be moved out of braking contact with the spool. As soon as tension is released on the line the spring will immediately pull down on the brake levers and urge the brake shoes into braking contact with the reel and overrunning of the spool will be effectively prevented.

From the foregoing description it can be seen that I have provided an exceptionally simple anti-backlash attachment for reels which will function successfully under all conditions and which will be extremely sensitive to the condition of line tension.

Changes in details may be made without departing from the spirit or the scope of my invention but what I claim as new is:

A fishing reel comprising a frame including end plates and connecting cross rods, a bracket connected to certain cross rods for engaging the reel seat of a rod, and a spool rotatably mounted in said frame having end discs, a pair of spaced brake levers having arcuate inner ends disposed between the side plates and extending over the spool and forwardly projecting arms, said arcuate portions having struck out bearings for receiving one of the cross rods, a cross strap connecting said arcuate portions together below the bearings, brake shoes connected to the arcuate portions adjacent to the strap and below said bearings, a tension spring connected to the bracket, an adjustable slide bracket carried by the cross strap connected to said spring, and a transversely extending guide eye carried by the forward ends of the arms for receiving the fishing line.

JOHN MARGIS, Jr.